UNITED STATES PATENT OFFICE.

GUSTAV ADOLF HOLZAPFEL, OF LEIPZIG, GERMANY.

METHOD OF MAKING THE MEAT OF SEA MAMMALS FIT FOR FOOD.

1,223,790. Specification of Letters Patent. Patented Apr. 24, 1917.

No Drawing. Application filed January 31, 1916, Serial No. 75,302. Renewed March 15, 1917. Serial No. 155,088.

*To all whom it may concern:*

Be it known that I, GUSTAV ADOLF HOLZAPFEL, a subject of the German Emperor, and resident of Leipzig, in the German Empire, have invented a new and Improved Method of Making the Meat of Sea Mammals Fit for Food, of which the following is a specification.

The invention consists of a process by means of which the meat of marine mammals, such as whales, seals, etc., is made edible, thus creating an economic substitute for the meat of the domestic animals. The process consists in the alternate treating of the meat with cold and warm water, the meat being either fresh or salted, which is followed by a certain method of curing in a liquid that has the tendency of extracting the untasty parts, or oils, etc. Finally the meat is pressed until dry.

The period of watering the meat differs in regard to the various meats and depends upon whether the meat is fresh or salted. Twenty four hours is the minimum period for watering, which may be extended to several days if required. At first cold water is employed, changing alternately to warm and cold water every 15 minutes. The temperature of the warm water is kept in the neighborhood of 30° centigrade.

For curing the meat, for which purpose the same must be cold, various ingredients may be employed according to the particular meat and the final purpose for which it is intended. A liquid for curing that will be serviceable in many cases is composed of a mixture of sodium chlorid (common salt), cane sugar, horse radish and water. The quantity of salt and sugar applied amounts to 5% each of the total quantity of curing liquid used. The horse radish is chopped into little pieces and added to the liquid.

The horse radish may be replaced by radish or other parts of plants that will act upon the meat in a similar way, or spirits, such for instance as rum, arrack or franzbrandwein may be used. The last mentioned agents can be used exclusively if fresh meat is to be treated in a warm condition. The meat should remain in the liquid for from two to eight days.

Finally the meat is wrapped in cloth and pressed dry, this being performed either by means of a hand press or with moderate pressure.

Having now described my invention and in what manner the same is to be performed, I claim:

1. The art of producing a meat food for human consumption which consists in subjecting sea mammal meat to the action of cold water and warm water in alternation, then subjecting the so treated sea mammal meat to the action of a pickling solution containing common salt, sugar and a flavoring ingredient, then subjecting the so pickled mammal meat to pressure operative to eliminate more or less of said pickling liquor together with extractive matters offensive to the taste.

2. The art of producing a meat food for human consumption which consists in subjecting for a period of at least one day sea mammal meat to the action of cold and warm water in alternation, then subjecting the so treated sea mammal meat to the action of a pickling solution containing common salt, sugar and a flavoring ingredient, then subjecting the so pickled sea mammal meat to pressure operative to eliminate more or less of said pickling liquor together with extractive matters offensive to the taste.

3. The art of producing a meat food for human consumption which consists in subjecting sea mammal meat to the action of cold water and warm water in alternation, then subjecting the so treated sea mammal meat to the action of an aqueous pickling solution containing common salt, sugar and a pungent alcoholic liquor, and then subjecting the so pickled sea mammal meat to pressure operative to eliminate more or less of said pickling liquor together with extractive matters offensive to the taste.

4. The art of producing a meat food for human consumption which consists in subjecting sea mammal meat to the action of cold water and warm water in alternation, then subjecting the so treated sea mammal meat to the action of an aqueous pickling solution containing common salt, sugar and a pungent alcoholic liquor, and a savory vegetable, then subjecting the so pickled sea mammal meat to pressure operative to eliminate more or less of said pickling liquor together with extractive matters offensive to the taste.

In testimony whereof I have signed my name to this specification, in the presence of two subscribing witnesses.

GUSTAV ADOLF HOLZAPFEL.

Witnesses:
RUDOLPH FRICKE,
MARTA KRALOPF.